Dec. 16, 1941.   N. B. LUND   2,266,223
LIQUID DISTRIBUTOR
Filed April 5, 1940   3 Sheets-Sheet 1
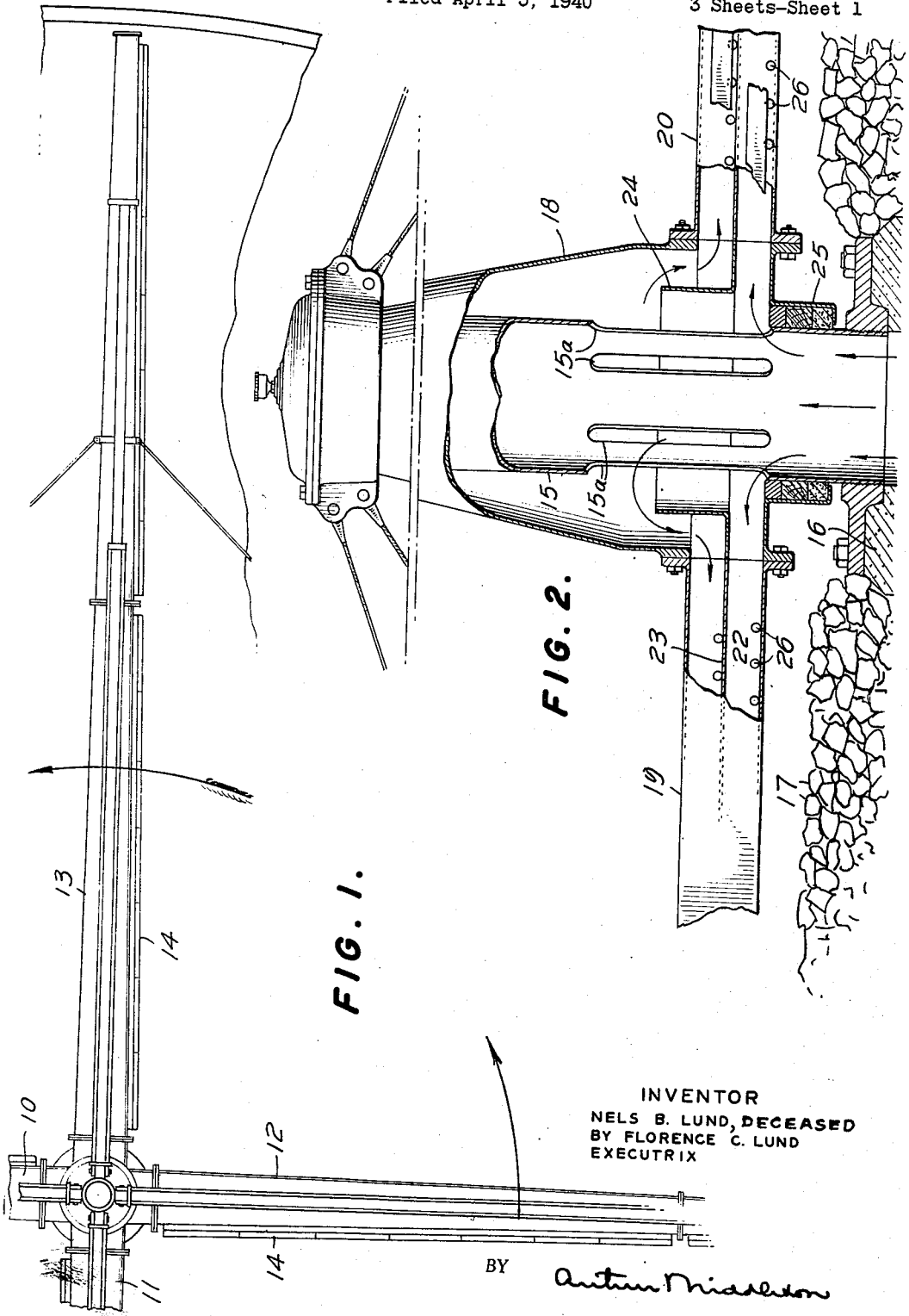
INVENTOR
NELS B. LUND, DECEASED
BY FLORENCE C. LUND
EXECUTRIX
BY   *Arthur Middleton*
ATTORNEY.

Dec. 16, 1941.　　　　N. B. LUND　　　　2,266,223
LIQUID DISTRIBUTOR
Filed April 5, 1940　　　3 Sheets-Sheet 2
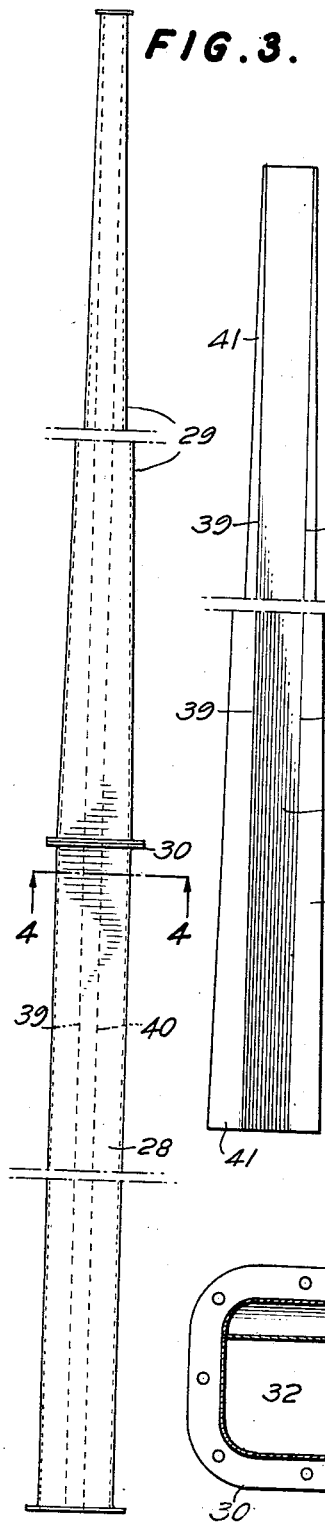
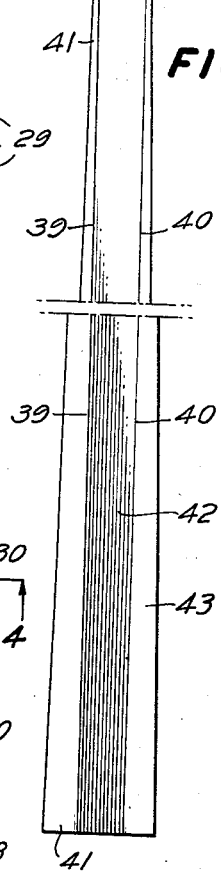
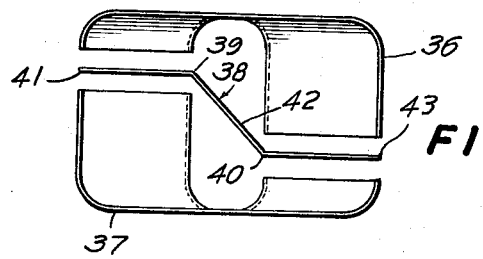
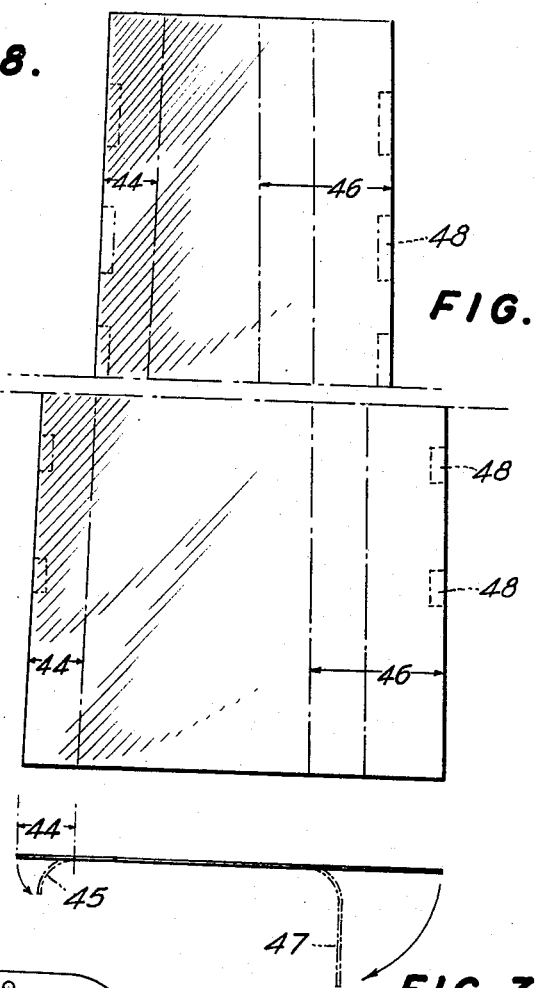
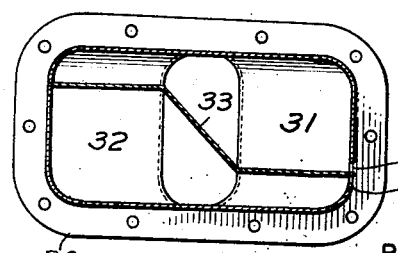
INVENTOR.
NELS B. LUND, DECEASED
BY FLORENCE C. LUND
EXECUTRIX
BY
ATTORNEY.

Dec. 16, 1941.   N. B. LUND   2,266,223
LIQUID DISTRIBUTOR
Filed April 5, 1940   3 Sheets-Sheet 3
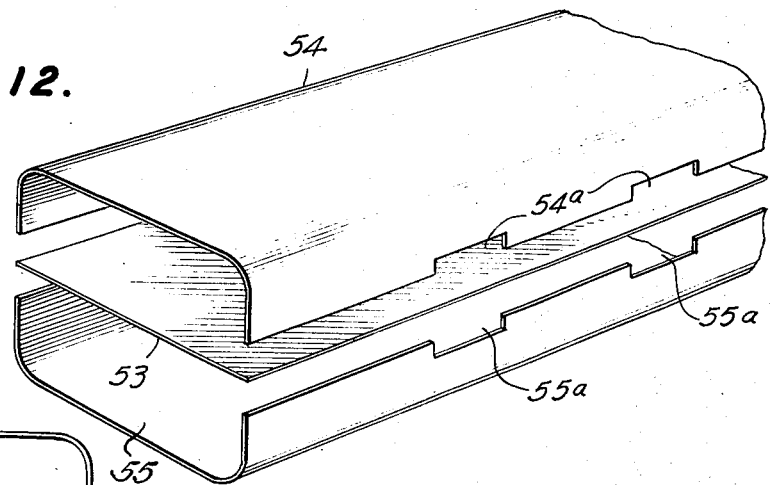
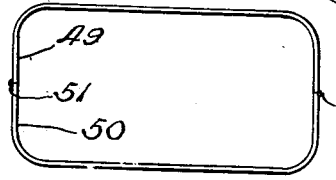
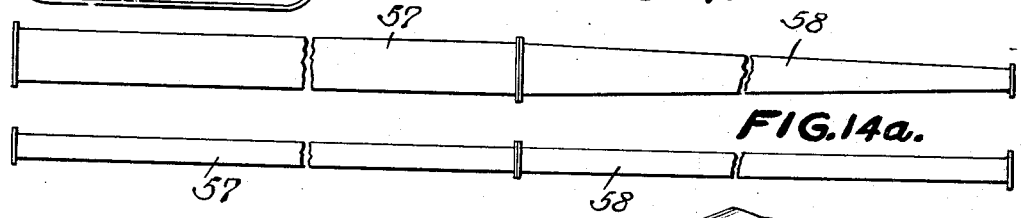
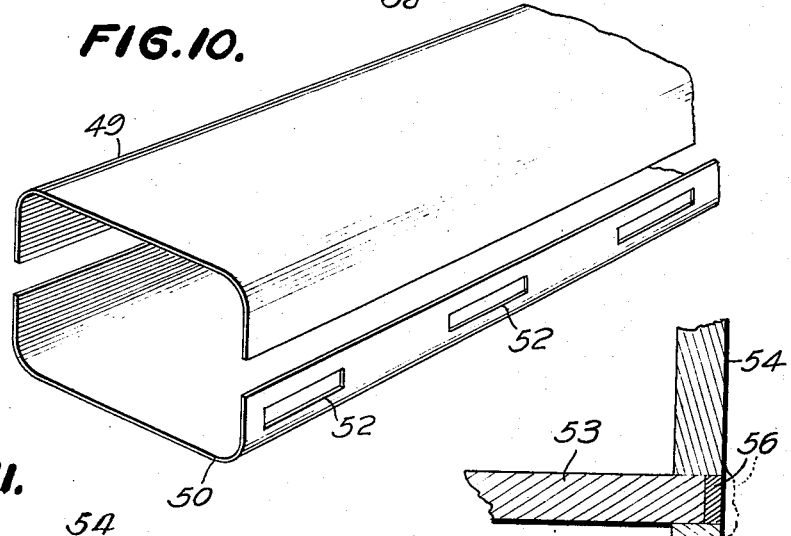
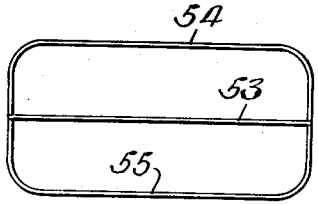
NELS B. LUND, DECEASED INVENTOR
BY FLORENCE C. LUND
EXECUTRIX
BY *Austin Middleton*
ATTORNEY.

Patented Dec. 16, 1941

2,266,223

UNITED STATES PATENT OFFICE 2,266,223

LIQUID DISTRIBUTOR

Nels B. Lund, deceased, late of Seaford, N. Y., by Florence C. Lund, executrix, Seaford, N. Y., assignor to The Dorr Company, Inc., New York, N. Y., a corporation of Delaware Application April 5, 1940, Serial No. 328,140

3 Claims. (Cl. 299—104)

This invention relates to distributors or disseminating devices for spraying liquids such as sewage onto filter beds or the like.

More specifically this invention relates to the rotary type of distributor having radial distributing or spray arms, and in which the rotation of the spray arms is produced by the hydraulic reaction of the liquid emitted from the orifices disposed laterally along the radial arms carried by a suitable rotative supporting structure.

In part, this invention is carved from and in part it represents improvements over the hydraulically operated type of distributor according to co-pending applications Ser. No. 200,940 and Ser. No. 273,290.

The efficiency of a distributor of this kind may be said to be inversely proportional to its operating head requirements, that is to say, the lower the requisite minimum operating head, the higher the efficiency. Low operating head requirement of such a machine is of great importance where the available head is limited by existing conditions, as illustrated in some sewage trickling filter installations where the machine must operate within inches of the margin of head available, and where consequently a saving of inches, or even fractions of an inch must be considered.

Another aspect of the importance of relatively low operating head requirements of the distributor is well illustrated in the case of certain high rate filters, where large volumes of liquid must be pumped to the distributor. In such case considerable savings may be effected by a reduction in the operating head required and due to the resulting saving in pumping cost.

A reduction in the operating head of such machines may be effected in various ways. One factor in effecting it is to arrange the distributor arms as closely to the filter surface as is compatible with proper distribution, and this again depends upon the design and arrangement of the openings or means by which the liquid discharges from the arms and upon the efficiency of the operation. Other factors are to provide for a suitably flattened flow cross-section of the arm; to arrange the liquid discharge from the arm in a manner to obtain optimum hydraulic driving reaction; to reduce the effective or total weight of the water filled distributor arms without sacrificing their hydraulic efficiency; and to reduce the hydraulic flow resistance in the arm.

Hence one object of the invention is that the distributor should be of improved efficiency and require a small hydraulic operating head. The device should respond readily to the hydraulic impulse. To this and the total or operating weight of the rotary part or rotor should be a practical minimum, and the arms should have a reasonable minimum of flow resistance, their cross-section to be of suitably flattened configuration such as will make for low operating head requirement.

Other objects are that the distributor, or distributor arms, should be of lightweight construction, while at the same time simple and economical to build.

These objects are attained by means of a distributor arm construction, which is flat, light, with a cross-sectional flow area tapering off towards the outer end of the arm, the degree and type of the taper being correlated to the number, size, and disposition of the liquid discharge openings, to attain a substantially uniform flow velocity throughout the length of the arm along with a minimum total weight of the liquid filled arms.

Heretofore distributor arms have been known to consist of several lengths of available standard pipe. Towards the outer end of the arm, each such length of pipe or section was followed by a section of smaller diameter, the stepping down of diameters being intended to take care of the diminishing flow volume. A stepping-down from one diameter to the next smaller diameter of the arm would require some sort of a reduction piece that would add to the weight, and more likely than not, to the hydraulic resistance of the arm. The pipes available being standard, their weight also was predetermined and could not be reduced below a minimum thus available.

According to one feature the degree and type of taper of the arm is correlated to the number, size and disposition of the liquid discharge openings in such a manner as to provide substantially uniform flow velocity throughout the arm coincident with substantially uniform distribution of the liquid over the filter bed.

According to another feature the hydraulic flow characteristics of the arm are improved in that the suitably flattened cross-section thereof is designed to have a substantially uniform height throughout, while at least a considerable portion of the lengths of the arm tapers down in width towards the free end of the arm. In this way the flow velocity in the arm can be readily correlated to the number, size and disposition of the liquid discharge openings and a desired shape of the arm be readily determined.

It is another feature of the invention to provide a trough-shaped sheet metal shell portion to constitute a lower, or else an upper component portion of the arm.

Such a trough-shaped tapered component portion may constitute one of a pair of half shell portions to make up the arm or a section thereof, and it is made from a suitable blank of plane sheet material by bending the longitudinal edge portions of the blank in a suitable manner to form the sides of the trough shape. The gauge or thickness of the sheet material is chosen from the wide standard variety available, and in accordance with the weight and strength requirements desirable for this purpose. In this way a suitably tapered arm section can be produced in a simple, economical and efficient manner.

According to still another feature, an edge portion of such a blank is provided with a series of cut-outs adapted to function as liquid discharge openings of the distributor arm.

According to still another feature, a partition is provided within the distributor arm in a manner to divide the same into a lower and an upper flow or operating section, which partition element joins in with welding seams uniting the two half shell portions of the arm along the sides thereof.

According to one embodiment a distributor arm consisting of complementary half-shell portions according to the invention, may comprise longitudinal sections of different taper, the widest section at the inner end of the arm being straight, that is to say, without taper, followed by a section having a slight taper, and then again followed by a section having a somewhat more pronounced taper, while the height of the cross-section remains substantially the same throughout the entire length of the arm, the cross-sections being designed in correlation to the arrangement of the liquid discharge openings, and in a manner to maintain substantially uniform flow velocity within the arm, along with a minimum of hydraulic flow resistance and static head requirements.

It is among the advantages derived from a distributor arm built according to features of this invention, that it lends itself particularly well for the handling of large flows to be distributed at relatively little head or pumping requirements. This adds a saving of operating cost to a relative saving in construction cost.

Other advantages are that the shape of an arm can be readily determined; that it can be cheaply and lightly built; and that its operation can be readily adjusted in accordance with the requirements of even filter distribution, desired flow velocities, and total operating efficiency.

The invention possesses other objects and features of advantage, some of which, with the foregoing, will be set forth in the following description. In the following description and in the claims, parts will be identified by specific names for convenience, but they are intended to be as generic in their application to similar parts as the art will permit. In the accompanying drawings there has been illustrated the best embodiment of the invention, but such embodiment is to be regarded as typical only of many possible embodiments, and the invention is not to be limited thereto.

The novel features considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings in which:

Fig. 1 is a top view of the distributor showing an arm of tapered configuration.

Fig. 2 is a part-sectional side view of the central portion of a distributor with two compartment arms.

Fig. 3 is a detail plan view of a distributor arm having a straight section followed by a tapered section.

Fig. 4 is a cross-section of the arm, taken upon line 4—4 of Fig. 3.

Fig. 5 shows the component parts of the arm section shown in Fig. 4, namely, an upper and a lower shell portion, and a partition plate.

Figs. 6 and 7 show the blank from which one of the component portions of the tapered arm section is made.

Fig. 8 is the plan view of the partition plate for the double compartment distributor arm.

Fig. 9 shows the cross-section of a distributor arm comprising welded together half-shell portions.

Fig. 10 is a perspective view of a portion of a distributor arm, showing the half-shell portions drawn apart.

Figs. 11 and 12 show a double compartment arm, in a manner similar to Figs. 9 and 10.

Fig. 13 is an enlarged cross-sectional detail of the welded juncture or welding seam of the arm shown in Figs. 11 and 12.

Fig. 14 is the plan view of a distributor arm having a section tapering width.

Fig. 14a is a side view of the arm of Fig. 14, indicating uniform height of the arm.

The general appearance of a four-arm distributor of the rotary reaction driven type is indicated in the plan view of Fig. 1, which view also indicates the tapered configuration of the distributor arms thereby representing the underlying feature of this invention. The arms are designated by numerals 10, 11, 12, 13. The arms carry liquid spreader strips 14, the function of which is hereinafter more specifically described.

To supplement the general picture of the distributor, there is shown in Fig. 2 a vertical part-sectional view of the central portion thereof, comprising a stationary column 15 placed on a concrete base 16 which may be assumed to be disposed in the center of a filter bed 17 of discrete material, for instance of the type used for sewage treatment or the like. Supported by the column 15 and rotatably mounted thereon is the central hub portion 18 of the distributor, carrying the distributor arms such as indicated at 19 and 20 in this view.

In the instance of Fig. 2, each distributor arm is shown to be subdivided longitudinally into an upper and a lower flow section 21 and 22 respectively. Accordingly, each arm has a horizontal partition 23, the partitions of all arms terminating at their inner end in a circular wall portion or weir 24 disposed within the hub portion 18. The rotary hub portion 18 is sealed with respect to the stationary column 15 by some suitable means, and which by way of example are herein indicated to be in the form of a packing 25.

The principle of operation of this distributor, although basically known, will now be briefly described to furnish the background for the structural improvements and refinements according to this invention.

Liquid enters from below into the hollow stationary column 15, and in passing through vertically elongated openings 15a thereof fills the lower flow section 22 of the distributor arms, from which the liquid discharges on to the filter bed 17 as by way of a series of discharge openings or orifices 26 disposed at and along what may be called the trailing side of the arm. If the flow section 22 is to function properly, at least enough static head must be available, to cause that flow section of the arm to be completely filled, in which case, due to the discharge under pressure of liquid from the orifices, there will be set up a reactive driving force that will cause the arms to rotate at a corresponding rate of speed. The speed of rotation then may depend upon the volume of water forced through the arms, and upon the excess of static pressure available, each arm or flow section having a maximum capacity under given flow and head conditions, at which it will operate efficiently.

Therefore, in the present instance, when the feed volume exceeds a predetermined maximum for the lower flow section, the excess liquid is automatically taken care of in and by the upper flow section 21 of the arm as the feed liquid rises to and above the level defined by the weir 24.

The static head or energy required for the operation of a device of this character may be said to be consumed or split up in various ways. Partly it is consumed by the mechanical resistance to rotation, partly by the resistance of the rotary masses to acceleration (the masses to be considered being those of the arms themselves, as well as of the liquid carried therein), and partly by various hydraulic resistance losses of the liquid flowing through and discharging from the device. The energy consumption (in terms of static head), also depends upon the effectiveness with which the liquid is passed through the arm and out through the orifices, in the sense of a maximum reactive driving force.

Fig. 3 is the plan view of a distributor shown to be foreshortened, and having embodied in it the feature of the tapering cross-section of at least a portion thereof. Hence this arm is shown to comprise a straight section 28 constituting the inner end portion thereof and a tapered section 29 constituting the outer end portion thereof. Both sections 28 and 29 of the arm may be connected in some suitable manner, and they are here shown to be connected with one another by means of a flange connection 30.

This arm is shown to be of the double compartment type, in that it has (see Fig. 4) an upper flow section 31 and a lower flow section 32, both flow sections being defined as such by a partition plate 33. The upper flow section has a series of liquid discharge openings 34, the lower flow section being provided with a series of liquid discharge openings 35. In this embodiment the liquid discharge openings 34 and 35 are disposed substantially near the bottom of the arm, in order to obtain as large as possible a recovery of operating head in the rotation of the device.

Fig. 5 shows the manner in which a tapered arm section according to this invention, is fabricated and composed of a lower and an upper half shell portion 36 and 37 respectively, and of a partition plate 38. The partition plate 38 embodies special features of configuration in that it is formed with a double break as indicated by the two longitudinally extending break lines at 39 and 40 (see Figs. 5 and 8), the break lines also being indicated in dotted lines in the view of Fig. 3. By reason of these break lines, the partition plate 38 is defined as having an upper horizontal portion 41 of triangular shape, a downwardly inclined portion 42 of rectangular shape, and a lower horizontal portion 43 of triangular shape.

The two half shell portions 36 and 37 constituting component portions of the tapered section of the distributor arm, are shown to be made or bent from a blank portion of plane material in the manner illustrated in Figs. 6 and 7, showing as a matter of example that blank portion from which the upper half shell portion 36 is made.

It will be noted that the blank portion, a plan view of which is shown in Fig. 6, is of slightly tapered contour. In order to form this blank portion into the desired half shell portion 36, the left-hand marginal portion 44 is bent down in the manner indicated in dotted lines in Fig. 7 (representing an end view of the blank portion), to form a relatively shorter shank 45, while the right-hand marginal portion 46 is bent down as similarly indicated in dotted lines to form the longer shank portion 47. The right-hand marginal portion 46 is furthermore provided with a series of cut-outs 48 to serve as liquid discharge openings when the component portions (Fig. 5) of the arm are assembled or welded together as shown in Fig. 4.

In distinction from the double compartment arm there is shown in Fig. 9 a single compartment or plain arm (having no partition), which is fabricated in a similar manner as the arm in Figs. 4 to 6, from two half shell portions, although these two half shell portions 49 and 50 are substantially symmetrical in themselves. The half shell portions 49 and 50 are connected with one another as by a welding seam 51. Fig. 10 shows the half shell portions 49 and 50 drawn apart in a position prior to their being welded together. The lower half shell portion 50 being shown to have a series of liquid discharge openings 52.

The form of a distributor arm illustrated in Figs. 11 and 12 differs from the illustration in Figs. 9 and 10 merely by the addition of a straight horizontal partition plate 53 interposed between the upper and the lower half shell portions 54 and 55 respectively. Each of these half shell portions has a series of cut-outs 54a and 55a respectively, to form their respective liquid discharge openings when the parts are welded together as in Fig. 11. As shown in the enlarged cross-sectional detail view of Fig. 13, a welding seam 56 joins the partition plate 53 with the upper and lower half shell portions 54 and 55 respectively.

Distributor arms according to this invention have their tapered configuration designed with a view to establishing a uniform flow velocity in the arm, along with uniform liquid distribution over the entire filter area.

A distributor arm embodying features of tapering configuration is shown in Figs. 14 and 14a. The plan view in Fig. 14 comprises a section 57 of uniform width, and a section 58 of tapering width.

The side view in Fig. 14a of this arm is shown to have substantially uniform height throughout. In this instance it is considered that the flow volume in the initial portion of the arm, that is in section 57, decreases by relatively small degrees because of the relatively small radii of the filter areas covered, hence the uniform cross section of the section 57 of this arm. More towards the end of the arm the flow cross-section tapers down as in the section 58 of the arm, because there the progressive decrease of flow volume is more strongly marked with the increase of the radii of the filter bed. If the height of the cross-section be left constant, the degree of taper is to be determined in one dimension only, and as nearly as practicable it is determined by the decrease in flow volume that passes through the arm. The desired degree of taper can be readily produced by the method of fabrication substantially as above described.

It will be seen that the foregoing structural refinements of this invention present on the one hand features of improved operating efficiency due to certain design in the configuration of the structure, and on the other hand features that have to do with the manufacturing steps involved in the construction.

It may be said that both types of features overlap, in that they permit the economical production of a functionally efficient construction.

As has been indicated, a distributor arm embodying features of this invention can be fabricated by bending suitable sheet metal blank pieces of suitable thinness (and therefore likeness), into half shell portions to be welded together to form the distributor arm or arm sections proper. In this way any desirable degree of taper may be economically produced, the degree and type of taper having been readily calculated on the basis of uniform flow velocity in the arm. In this way it is possible to reduce the weight of the arms, as well as of the water load therein, to a practical minimum, this being tantamount to reducing to a minimum the requisite operating head, or, in other words, tantamount to raising the operating efficiency of the machine.

In order to obtain a desired rate of liquid distribution from the distributor arms and a desired distribution of the liquid over the filter area, the discharge openings in the arms may be provided with means for adjusting the rate of flow therefrom, such as adjustable blanking-off plates.

What is claimed is:

1. A liquid distributor of the rotary reaction driven type adapted for spraying liquids onto filter beds, comprising a distributor arm having a series of liquid discharge openings at and along its trailing side, at least a substantial portion of said arm, including the outer end portion thereof, being tapered in width in the direction of its free end, but substantially uniform in height.

2. A liquid distributor according to claim 1, in which said tapered arm portion comprises an upper and a lower trough-shaped half shell portion, both said portions being welded together at their longitudinal edges.

3. A liquid distributor according to claim 1, in which said tapered arm portion comprises an upper and a lower trough-shaped half shell portion, both said portions being welded together at their longitudinal edges, with the addition of a partition plate dividing the arm into an upper and a lower flow operating section, the respective longitudinal edge portions of said partitioning plate being substantially joined in by welding with corresponding welding seams connecting the two trough-like portions of the arm, said upper as well as said lower flow operating section having a series of liquid discharge openings therein.

FLORENCE C. LUND,
*Executrix of the last will and testament of Nels B. Lund, deceased.*